(12) United States Patent
Zheng et al.

(10) Patent No.: US 11,374,843 B2
(45) Date of Patent: Jun. 28, 2022

(54) METHOD FOR MEASURING NETWORK SPEED, COMPUTING DEVICE, AND COMPUTER-PROGRAM PRODUCT

(71) Applicant: Shanghai Bilibili Technology Co., Ltd., Shanghai (CN)

(72) Inventors: Hanchao Zheng, Shanghai (CN); Zhiqiang Wu, Shanghai (CN); Hui Chen, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/374,637

(22) Filed: Jul. 13, 2021

(65) Prior Publication Data

US 2021/0344584 A1 Nov. 4, 2021

Related U.S. Application Data

(63) Continuation of application No. PCT/CN2019/128440, filed on Dec. 25, 2019.

(30) Foreign Application Priority Data

Jan. 30, 2019 (CN) .......................... 201910091999.8

(51) Int. Cl.
*H04L 43/10* (2022.01)
*H04L 65/1101* (2022.01)
(Continued)

(52) U.S. Cl.
CPC .......... *H04L 43/10* (2013.01); *H04L 65/1101* (2022.05)

(58) Field of Classification Search
None
See application file for complete search history.

(56) References Cited

U.S. PATENT DOCUMENTS 8,396,983 B1 * 3/2013 Inskip ............... H04L 29/06523
709/233
10,110,507 B2 10/2018 Fablet et al.
(Continued)

FOREIGN PATENT DOCUMENTS

CN 103379379 A 10/2013
CN 105490886 A 4/2016
(Continued)

OTHER PUBLICATIONS

Author: Waqas ur Rahman, Kwangsue Chung Title: "A novel adaptive logic for dynamic adaptive streaming over HTTP" Date: Oct. 20, 2017 Pulisher: Elsevier (Year: 2017).*

(Continued)

*Primary Examiner* — Ninos Donabed
*Assistant Examiner* — Kamal Hossain
(74) *Attorney, Agent, or Firm* — McAndrews, Held & Malloy, Ltd.

(57) ABSTRACT

A method of measuring a network speed, a computing device, and a computer-program product are provided. The method includes: obtaining a downloading duration and a downloading byte count of each of N consecutive video segments upon receiving a network speed measurement command during downloading video content, wherein the video content comprises multiple video segments; calculating out a total downloading duration and a total downloading byte count of the N video segments according to the downloading duration and the downloading byte count of each of the N video segments; and calculating out a current network speed according to the total downloading duration and the total downloading byte count.

15 Claims, 3 Drawing Sheets

(51) Int. Cl.
  *H04L 43/0894* (2022.01)
  *H04N 21/845* (2011.01)
  *H04N 21/442* (2011.01)

(56) References Cited

U.S. PATENT DOCUMENTS

| | | | | |
|---|---|---|---|---|
| 2012/0281715 | A1* | 11/2012 | Shojania | H04L 43/0882 370/468 |
| 2017/0026713 | A1* | 1/2017 | Yin | H04N 21/643 |
| 2017/0094301 | A1* | 3/2017 | Gu | H04N 19/503 |

FOREIGN PATENT DOCUMENTS

| CN | 106 210 929 A | 12/2016 |
|---|---|---|
| CN | 106921870 A | 7/2017 |
| CN | 107613330 A | 1/2018 |
| CN | 108419093 A | 8/2018 |
| CN | 110121100 A | 8/2019 |
| CN | 105991708 B | * 12/2021 |
| EP | 3 324 639 A1 | 5/2018 |
| WO | 2017100769 A | 6/2017 |

OTHER PUBLICATIONS

International Search Report dated Mar. 27, 2020, in International application No. PCT/CN2019/x128440 filed on Dec. 25, 2019.
International Search Report with a mailing date of X Month 2020, in International application No. PCT/CN2019/xx, filed on X Month 2019.
The extended European search report for Application No. 19913977.5, dated Jan. 4, 2022, European Patent Office, Germany (9 pages).
Kesavan Selvaraj et al: "Effective client-driven three-level rate adaptation (TLRA) approach for adaptive HTTP streaming," Multimedia Tools and Applications, Kluwer Academic Publishers, Boston, US, vol. 77, No. 7, May 9, 2017 (May 9, 2017), pp. 8081-8114, XP036473945, ISSN: 1380-7501, DOI: 10.1007/S11042-017-4705-Y [retrieved on May 9, 2017].

* cited by examiner

METHOD FOR MEASURING NETWORK SPEED, COMPUTING DEVICE, AND COMPUTER-PROGRAM PRODUCT

CROSS-REFERENCE TO RELATED APPLICATIONS

The present application is a continuation under 35 U.S.C. 111(a) of PCT International Application No. PCT/CN2019/128440, filed on Dec. 25, 2019, which claims priority to Chinese patent application No. 201910091999.8 filed on Jan. 30, 2019, the entire contents of which are hereby incorporated by reference in its entirety for all purposes.

TECHNICAL FIELD

The present application relates to a technical field of computer technologies, and more particularly to a method measuring a network speed, a computing device, and a computer-program product.

BACKGROUND

With the continuous development of Internet and smart terminals, more and more users choose to use smart terminals (such as mobile phones and computers) to play audio, video, and other streaming media. Users can obtain video contents and audio contents from network servers through smart terminals, and cause them to be played on the smart terminals.

SUMMARY

One aspect of the present application provides a method of measuring a network speed, the method including: obtaining a downloading duration and a downloading byte count of each of N consecutive video segments upon receiving a network speed measurement command during downloading video content, wherein the video content includes multiple video segments; calculating out a total downloading duration and a total downloading byte count of the N video segments according to the downloading duration and the downloading byte count of each of the N video segments; and calculating out a current network speed according to the total downloading duration and the total downloading byte count.

The present application further provides a computing device, which includes: one or more processors; and one or more non-transitory computer-readable storage media containing instructions configured to cause the one or more processors to perform operations including: obtaining a downloading duration and a downloading byte count of each of N consecutive video segments upon receiving a network speed measurement command during downloading video content wherein the video content includes multiple video segments; calculating out a total downloading duration and a total downloading byte count of the N video segments according to the downloading duration and the downloading byte count of each of the N video segments; and calculating out a current network speed according to the total downloading duration and the total downloading byte count.

The present application further provides a non-transitory computer-program product tangibly embodied in a machine-readable non-transitory storage medium that includes instructions configured to cause one or more processors to perform operations comprising: obtaining a downloading duration and a downloading byte count of each of N consecutive video segments upon receiving a network speed measurement command in the process of downloading video content wherein the video content includes multiple video segments; calculating out a total downloading duration and a total downloading byte count of the N video segments according to the downloading duration and the downloading byte count of each of the N video segments; and calculating out a current network speed according to the total downloading duration and the total downloading byte count.

BRIEF DESCRIPTION OF THE DRAWINGS

Upon reading the detailed description of the some embodiments below, various other advantages and benefits will become apparent to those of ordinary skill in the art. The drawings are only for the purpose of illustrating some embodiments and are not to be considered as limiting the present application. Moreover, the same reference numerals are used throughout the drawings to refer to the same parts. In the drawings.

DETAILED DESCRIPTION

Frame freezing often occurs during playing video, and one reason for the frame freezing is that the current network speed is not enough to support video playing with a high resolution. The inventor realized that no practice of providing network speed measurement during playing video exists in current industry. Therefore, how to measure the network speed during playing video to allow the users to choose video with an appropriate resolution, has become an urgent technical problem.

To make the objectives, technical solutions, and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without making creative efforts shall fall within the protection scope of the present application.

The method of measuring a network speed provided in the present application is described below with reference to the accompanying drawings.

Figure 1:
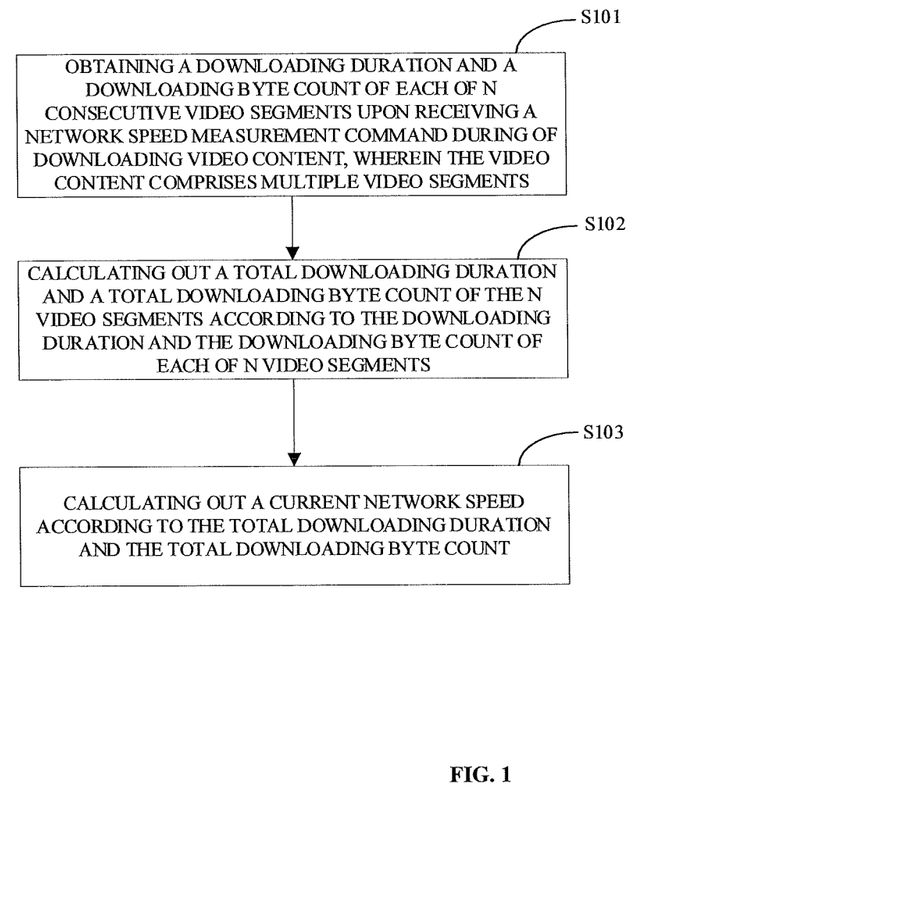
FIG. 1 illustrates an example flowchart of a method of measuring a network speed according to some embodiments.

FIG. 1 illustrates an example flowchart of a method of measuring a network speed provided by some embodiments. The method is applied to a client. As shown in FIG. 1, the method includes the following steps:

Step 101, obtaining a downloading duration and a downloading byte count of each of N consecutive video segments upon receiving a network speed measurement command during downloading video content, wherein the video content includes multiple video segments, and N is a positive integer.

In some embodiments, audio and video content is downloaded and played by using DASH (Dynamic Adaptive Streaming over HTTP) technology. DASH is an adaptive bitrate streaming technology that enables high-quality streaming media to be delivered over the Internet through a traditional HTTP web server. In traditional audio and video playing technologies, audio content and video content are contained in one streaming media file, and the client obtains the streaming media file from the server and performs audio and video playing through parsing the streaming media file. In comparison, in DASH technology, the audio content and the video content are separated, and the client needs to obtain video data files and audio data files separately from the server and perform audio and video playing through parsing the video data files and audio data files. It should be noted that, in some embodiments, the network speed is measured according to downloaded video content.

The downloading duration is the time required to download a video segment, and the downloading byte count is the number of bytes occupied by downloading a video segment.

In some embodiments, there are three ways to set up a video segment as follows: The first way, each video segment is a respective segment of the video content having a set play duration;

The second way, each video segment is a respective segment of the video content having a set byte count;

The third way, whether a required downloading byte count for downloading a segment of the video content having a set play duration is greater than a set byte count is determined when receiving the network speed measurement command. If the required downloading byte count for downloading the segment of the video content having the set play duration is greater than the set byte count, each segment of the video content having the set play duration is taken as a respective video segment. If the required downloading byte count for downloading the segment of the video content having the set play duration is not greater than the set byte count, each segment of the video content having the set byte count is taken as a respective video segment.

For the first way, each segment of the video content having a set play duration is taken as a respective video segment. For example, each segment of the video content with a play duration of 10 seconds is taken as a respective video segment. In this case, whenever a segment of the video content with a play duration of 10 seconds is downloaded, a downloading duration and a corresponding downloading byte count required to download the 10 seconds of the segment of the video content are counted.

For the second way, each segment of the video content having a set byte count is taken as a respective video segment. For example, each segment of the video content having 512 kilobytes is taken as a respective video segment. In this case, whenever a segment of the video content having 512 kilobytes is downloaded, a downloading duration required to download the 512 KB segment of the video content is counted.

It should be noted that the play duration is a time length of playing video content. For example, when playing a piece of advertisement content with a play duration of 30 seconds, when a video segment is defined using the play duration, the downloading duration and the downloading byte count need to be counted. When a video segment is defined using the set byte count, the downloading byte count is the set byte count, and only the downloading duration needs to be counted.

In addition, in the DASH technology, the video content is divided into multiple segments, each segment corresponding to a certain time length of the content. For example, a piece of advertisement with a play duration of 30 seconds is divided into three segments, each segment including 10 seconds of video content. When a user needs this advertisement to be played in the client, the client needs to establish a connection with servers to obtain each segment from the servers in sequence, and the client then plays the three segments in sequence to complete the playing of the advertisement.

Therefore, when the video segment is a segment of the video content having a set play duration, the set play duration may be consistent with the play duration of each segment of the video content. In this case, in step 101, the downloading duration and the downloading byte count of each of the N consecutive video segments are obtained.

For the third way, the set play time may be used for defining a video segment; however, if the downloading byte count required to download one video segment is too small, it is insufficient to evaluate the current network speed. Therefore, in order to avoid a situation that the downloading byte count of one video segment is too small, it can be first determined whether the downloading byte count required to download the segment of the video content having the set play duration is greater than the set byte count. If the downloading byte count required to download the segment of the video content having the set play duration is not greater than the set byte count, a segment of the video content having the set byte count is defined as one video segment, that is, taking each segment of the video content having the set byte count as a respective video segment. For example, when playing video content with a low resolution (360p), it is calculated that a segment of the video content having the set play duration (5 seconds) only occupies 300 KB, which is less than the set byte count (512 KB), so a corresponding 512 KB segment of the video content is treated as a video segment, and a downloading duration required to download the 512 KB segment of the video content is counted.

In some embodiments, a minimum value of N is 4 for the following reasons: in a process of TCP communication, there is a customized receiving window for caching a certain number of bytes of video content (for example, caching 2 MB of video content); therefore, the video segment appearing in step S101 is video content that has been cached in the receiving window, which causes an inaccurate count of the downloading duration of the video segment, thus affecting the accuracy of the current network speed obtained by the final calculation. To reduce the influence of the receiving window on the measurement results, in some embodiments, downloading durations and downloading byte counts of at least four video segments are obtained, thereby improving the accuracy of the calculation results.

Step S102, calculating out a total downloading duration and a total downloading byte count of the N video segments according to the downloading duration and the downloading byte count of each of the N video segments.

In some embodiments, the total downloading duration T is calculated out according to the following formula:

$$T=(t_1+t_2+\ldots+t_N),$$

where t is the downloading duration of each of the N video segments.

The total downloading byte count B is calculated out according to the following formula:

$$B=(b_1+b_2+\ldots+b_N),$$

where b is the downloading byte count of each of the N video segments.

Further, the obtaining the downloading duration and the downloading byte count of each of the N consecutive video segments includes:

determining whether a downloading duration of a latter video segment is M times a downloading duration of a previous video segment, where M is a positive integer; and if the downloading duration of the latter video segment is M times the downloading duration of the previous video segment, obtaining a downloading duration and a downloading byte count of each of further M consecutive video segments.

When the further M consecutive video segments are to be obtained, the calculating out the total downloading duration and the total downloading byte count of the N video segments according to the downloading duration and the downloading byte count of each of the N video segments includes:

calculating out a total downloading duration and a total downloading byte count of the (N+M) video segments according to the downloading duration and the downloading byte count of each of the (N+M) video segments.

In some embodiments, in order to prevent abnormal network fluctuation, the number of video segments for calculating the current network speed are added dynamically. In one example, 4 to 10 video segments are used to calculate the current network speed. In some embodiments, when the downloading duration of the latter video segment is greater than that of the previous video segment, the downloading duration of the latter video segment is used to divide the downloading duration of the previous video segment and the result is rounded up to obtain a multiplier M. When M is greater than 1, it means that abnormal network fluctuation exists. To eliminate the abnormal network fluctuation, M video segments are further used in addition to original N video segments, to calculate out the current network speed through the downloading duration and downloading byte count of the (N+M) video segments.

Step S103, calculating out the current network speed according to the total downloading duration and the total downloading byte count.

In some embodiments, the current network speed Q is calculated out according to the following formula:

$$Q=B/T$$

Further, after step S103, the method further includes:

adjusting a resolution of a segment of the video content currently being played according to the current network speed, so that the adjusted resolution adapts to the current network speed.

In some embodiments, a maximum resolution supported by the current network speed is determined by the calculated current network speed. For example, the calculated current network speed is 120 Mbps, and available resolutions include 1080p, 720p, 480p, 360p, among which a bandwidth requirement for 1080p is 150 Mbps, a bandwidth requirement for 720p is 100 Mbps, a bandwidth requirement for 480p is 50 Mbps, and a bandwidth requirement for 360p is 25 mbps. As the current network speed can meet the bandwidth requirement for 720p, the resolution of the video content to be played later may be adjusted to 720P.

According to the method of measuring a network speed provided by the present application, a current network speed is calculated out by counting a downloading duration and a downloading byte count of a set number of video segments, and a resolution of the video content being played is adjusted to a resolution supported by the current network speed based on the calculated current network speed, thus ensuring smooth play of the video content and improving user's experience. The present application provides a technical solution for calculating the current network speed and adjusting the resolution in real-time during playing the video content, and may avoid the impact of network abnormal fluctuation and TCP receiving window on calculation results, which improves the accuracy of the calculation results.

Figure 2:
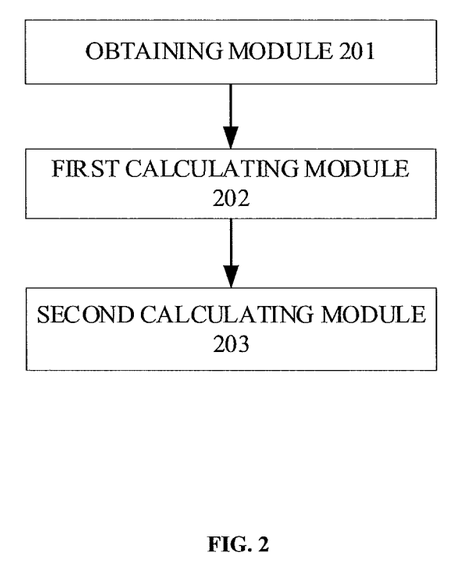
FIG. 2 illustrates an example block diagram of a device of measuring a network speed according to some embodiments.

A device of measuring a network speed is provided according to some embodiments, based on the method of measuring the network speed provided in some embodiments. FIG. 2 illustrates an example block diagram of a device of measuring a network speed. The device of measuring the network speed is divided into one or more program modules stored in a storage medium and executed by one or more processors to complete the application. The program module as mentioned in the application is a series of computer-readable instruction segments which are capable of completing specific functions, and more suitable than the program itself to describe the execution process of the device of measuring the network speed in the storage medium. The following description will introduce the functions of each program module in some embodiments.

As shown in FIG. 2, the device of measuring the network speed applied to a client includes the following components.

An obtaining module 201 is for obtaining a downloading duration and a downloading byte count of each of N consecutive video segments upon receiving a network speed measurement command during downloading video content, wherein the video content includes multiple video segments.

Each of the multiple video segments is a respective segment of the video content having a set play duration, or a respective segment of the video content having a set byte count.

Generally, the downloading duration is the time required to download a video segment, and the downloading byte count is the number of bytes occupied by downloading a video segment.

For example, each segment of the video content with a play duration of 10 seconds is taken as a respective video segment. In this case, whenever a segment of the video content with a play duration of 10 seconds is downloaded, a downloading duration and a corresponding downloading byte count required to download the 10 seconds segment of the video content are counted. In another example, each segment of the video content with a byte count of 512 kilobytes is taken as a respective video segment. In this case, whenever the 512 kilobytes segment of the video content is downloaded, a downloading duration required to download the 512 kilobytes segment of the video content is counted.

It should be noted that the play duration is a time length of playing video content. For example, for a piece of advertisement content with a play duration of 30 seconds, when a video segment is defined as a segment of the video content having the set play duration, the downloading duration and the downloading byte count need to be counted; when a video segment is defined as a segment of the video content having a set byte count, the downloading byte count is the set byte count, and only the downloading duration needs to be counted. When the video segment is a segment of the video content having a set play duration, the set play duration may be consistent with the play duration of each segment of the video content, in which case a video segment is a segment of the video content.

Further, the device further includes:

a setting module for determining, upon receiving the network speed measurement command, whether a downloading byte count required for downloading a segment of the video content having a set play duration is greater than a set byte count. In response to determining that the required downloading byte count for downloading the segment of the video content having the set play duration is greater than the set byte count, the setting module takes each segment of the video content having the set play duration as a respective video segment. In response to determining that the required downloading byte count for downloading the segment of the video content having the set play duration is not greater than the set byte count, the setting module takes each segment of the video content having the set byte count as a respective video segment.

In some embodiments, the set play time may be used for defining a video segment; however, if the downloading byte count required to download one video segment is too small, it is insufficient to evaluate the current network speed. Therefore, in order to avoid a situation that the downloading byte count of one video segment is too small, it can be first determined whether the downloading byte count required to download the segment of the video content having the set play duration are greater than the set byte count. If the downloading byte count required to download the segment of the video content with the set play duration is not greater than the set byte count, a segment of the video content having the set byte count is defined as one video segment, that is, taking each segment of the video content with the set byte count as a respective video segment. For example, when playing video content with a low resolution (360p), it is calculated that a segment of the video content having the set play duration (5 seconds) only occupies 300 KB, which is less than the set byte count (512 KB), so a corresponding 512 KB segment of the video content is treated as a video segment.

A first calculating module 202 is for calculating out a total downloading duration and a total downloading byte count of the N video segments according to the downloading duration and the downloading byte count of each of the N video segments.

In some embodiments, the first calculating module 202 is for:

calculating out the total downloading duration T according to the following formula:

$$T=(t_1+t_2+ \ldots +t_N)$$

where t is the downloading duration of each of the N video segments; and calculating out the total downloading byte count B according to the following formula:

$$B=(b_1+b_2+ \ldots +b_N),$$

where b is the downloading byte count of each of the N video segments.

A second calculating module 203 is for calculating out a current network speed according to the total downloading duration and the total downloading byte count.

In some embodiments, the first calculating module 203 is for: calculating out the current network speed Q according to the following formula:

$$Q=B/T.$$

Further, the device further includes:

a determining module for determining whether a downloading duration of a latter video segment is M times a downloading duration of a previous video segment. In response to determining that the downloading duration of the latter video segment is M times the downloading duration of the previous video segment, a downloading duration and a downloading byte count of each of further M consecutive video segments are obtained.

When the downloading duration and the downloading byte count of each of further M consecutive video segments are to be obtained, the first calculating module 202 is used for:

calculating out a total downloading duration and a total downloading byte count of the (N+M) video segments according to the downloading duration and the downloading byte count of each of the (N+M) video segments.

In some embodiments, in order to prevent abnormal network fluctuation, the number of video segments for calculating the current network speed are added dynamically. In one example, 4 to 10 video segments are used to calculate the current network speed. In some embodiments, when the downloading duration of the latter video segment is greater than that of the previous video segment, the downloading duration of the latter video segment is used to divide the downloading duration of the previous video segment and the result is rounded up to obtain a multiplier M. When M is greater than 1, it means that abnormal network fluctuation exists. To eliminate the abnormal network fluctuation, M video segments are further used in addition to original N video segments, to calculate out the current network speed through the downloading duration and downloading byte count of the (N+M) video segments.

Further, the device further includes:

an adjusting module for adjusting a resolution of a segment of the video content currently being played according to the current network speed, so that the adjusted resolution adapts to the current network speed.

In some embodiments, a maximum resolution supported by the current network speed is determined according to the calculated current network speed. For example, the calculated current network speed is 120 Mbps, and available resolutions include 1080p, 720p, 480p, 360p, among which a bandwidth requirement for 1080p is 150 Mbps, a bandwidth requirement for 720p is 100 Mbps, a bandwidth requirement for 480p is 50 Mbps, and a bandwidth requirement for 360p is 25 mbps. As the current network speed can meet the bandwidth requirement for 720p, the resolution of the video content to be played later may be adjusted to 720P.

Figure 3:
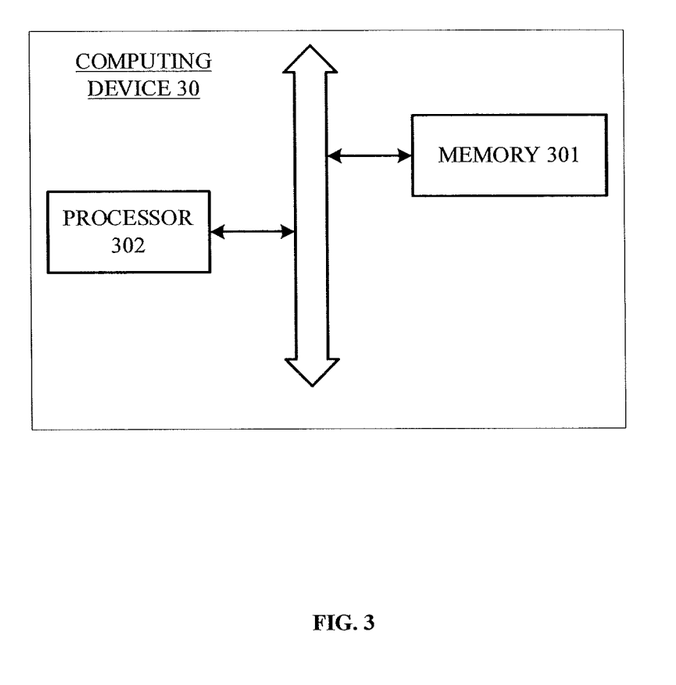
FIG. 3 illustrates an example diagram of hardware architecture of a computing device according to some embodiments.

A computing device is also provided, such as a smartphone, a tablet computer, a notebook computer, a desktop computer, a rack server, a blade server, a tower server, or a rack server (including a stand-alone server, or a server cluster formed by multiple servers) that can execute programs, according to some embodiments. As shown in FIG. 3, the computing device 30 of some embodiments includes (and is not limited to) at least a memory 301 and a processor 302 that can be communicatively connected to each other through a system bus. It should be noted that FIG. 3 only shows the computing device 30 having the components 301-302, but it should be understood that not all components shown are required to be implemented, and more or fewer components may be implemented instead.

In some embodiments, the memory 301 (i.e., a readable storage medium) includes a flash memory, a hard disk, a multimedia card, a card-type memory (such as an SD or DX memory and so on), a random access memory (RAM), a static random access memory (SRAM), a read-only memory (ROM), an electrically erasable programmable read-only memory (EEPROM), a programmable read-only memory (PROM), a magnetic memory, magnetic disks, optical disks and so on. In some embodiments, the memory 301 may be an internal storage unit of the computing device 30, such as a hard disk or a memory of the computing device 30. In other embodiments, the memory 301 may also be an external storage device of the computing device 30, such as a plug-in hard disk, a smart media card (SMC), and a Secure Digital (SD) card, a Flash Card and so on. Of course, the memory 301 may also include both the internal storage unit of the computing device 30 and its external storage device. In some embodiments, the memory 301 is generally used to store an operating system and various types of application software installed in the computing device 30, such as program codes of the device of measuring the network speed in some embodiments. In addition, the memory 301 can also be used to temporarily store various types of data that have been output or will be output.

The processor 302 may be a Central Processing Unit (CPU), a controller, a microcontroller, a microprocessor, or other data processing chips in some embodiments. The processor 302 is generally used to control the overall operation of the computing device 30.

In some embodiments, the processor 302 is configured to execute a program of a method of measuring a network speed stored in the processor 302, and when the program of the method of measuring the network speed is executed, the following steps are implemented:

obtaining a downloading duration and a downloading byte count of each of N consecutive video segments upon receiving a network speed measurement command during downloading video content, where the video content includes multiple video segments;

calculating out a total downloading duration and a total downloading byte count of the N video segments according to the downloading duration and the downloading byte count of each of the N video segments; and calculating out a current network speed according to the total downloading duration and the total downloading byte count.

For a specific embodiment and process of the foregoing method steps, reference can be made to some embodiments, which is not repeated here.

A computer-readable storage medium (volatile or non-volatile) is also provided according to some embodiments, such as a flash memory, a hard disk, a multimedia card, a card-type memory (for example, an SD or DX memory and so on), a random access memory (RAM), a static random access memory (SRAM), a read-only memory (ROM), an electrically erasable programmable read-only memory (EEPROM), a programmable read-only memory (PROM), a magnetic memory, magnetic disks, optical disks, servers, App Store and so on, which stores computer-readable instructions that upon execution by a processor cause the processor to implement the following steps:

obtaining a downloading duration and a downloading byte count of each of N consecutive video segments upon receiving a network speed measurement command during downloading video content, where the video content includes multiple video segments;

calculating out a total downloading duration and a total downloading byte count of the N video segments according to the downloading duration and the downloading byte count of each of the N video segments; and calculating out a current network speed according to the total downloading duration and the total downloading byte count.

For a specific embodiment and process of the foregoing method steps, reference can be made to some embodiments, which is not repeated here.

According to the method and device of measuring the network speed, the computing device, and the readable storage medium provided by some embodiments, the current network speed is calculated by counting a downloading duration and a downloading byte count of a set number of video segments, and a resolution of the video content being played is adjusted to a resolution supported by the current network speed based on the calculated current network speed, thus ensuring smooth play of the video content and improving user's experience. The embodiments provide a technical solution for calculating the current network speed and adjusting the resolution in real-time in a process of playing the video content, and can avoid the impact of network abnormal fluctuation and TCP receiving window on calculation results, which improves the accuracy of the calculation results.

It should be noted that, in this article, the terms "including", "comprising" or any other variants thereof are intended to cover non-exclusive inclusion, so that a process, method, article or device including a series of elements includes not only those elements, but also other elements not explicitly listed, or elements inherent to such a process, method, article, or device. Without more restrictions, an element limited by the sentence "including a . . . " does not exclude that there are other identical elements in the process, method, article, or device that includes the element.

Through the description of the above embodiments, those skilled in the art can clearly understand that the methods in the above embodiments can be implemented by means of software plus a necessary universal hardware platform, and of course, also by hardware, but in many cases, the former is the better implementation.

The above are only example embodiments of the present application, and thus do not limit the patent scope of the present application. Any equivalent structure or equivalent process transformation made by using the contents of the specification and drawings of the present application, or directly or indirectly used in other related technical fields are both included in the scope of the patent protection of this application.

What is claimed is:

1. A method comprising:
obtaining a downloading duration and a downloading byte count of each of N consecutive video segments upon receiving a network speed measurement command during downloading video content, wherein N is a positive integer, wherein the video content comprises multiple video segments, and wherein the obtaining the downloading duration and the downloading byte count of each of the N consecutive video segments comprises:
determining whether a downloading duration of a latter video segment of two consecutive ones of the N consecutive video segments is M times a downloading duration of a previous video segment of the two consecutive ones of the N consecutive video segments, wherein M is a positive integer; and
in response to determining that the downloading duration of the latter video segment is M times the downloading duration of the previous video segment, obtaining a downloading duration and a downloading byte count of each of further M consecutive video segments;
calculating out a total downloading duration and a total downloading byte count of the N video segments according to the downloading duration and the downloading byte count of each of the N video segments, wherein the calculating out the total downloading duration and the total downloading byte count of the N video segments according to the downloading duration and the downloading byte count of each of the N video segments comprises:

calculating out a total downloading duration and a total downloading byte count of the (N+M) video segments according to the downloading duration and the downloading byte count of each of the (N+M) video segments; and calculating out a current network speed according to the total downloading duration and the total downloading byte count.

2. The method of claim 1, wherein each of the multiple video segments is a respective segment of the video content having a set play duration, or a respective segment of the video content having a set byte count.

3. The method of claim 1, further comprising:

determining, upon receiving the network speed measurement command, whether a required downloading byte count for downloading a segment of the video content having a set play duration is greater than a set byte count;

in response to determining that the required downloading byte count for downloading the segment of the video content having the set play duration is greater than the set byte count, taking each segment of the video content having the set play duration as a respective one of the multiple video segments; and in response to determining that the required downloading byte count for downloading the segment of the video content having the set play duration is not greater than the set byte count, taking each segment of the video content having the set byte count as a respective one of the multiple video segments.

4. The method of claim 1, further comprising, after calculating out the current network speed:

adjusting a resolution of a segment of the video content currently being played according to the current network speed, so that the adjusted resolution adapts to the current network speed.

5. The method of claim 1, wherein the N consecutive video segments are at least four video segments.

6. A computing device comprising:

one or more processors; and one or more non-transitory computer-readable storage media containing instructions configured to cause the one or more processors to perform operations comprising:

obtaining a downloading duration and a downloading byte count of each of N consecutive video segments upon receiving a network speed measurement command during downloading video content, wherein N is a positive integer, wherein the video content comprises multiple video segments, and wherein the obtaining the downloading duration and the downloading byte count of each of the N consecutive video segments comprises:

determining whether a downloading duration of a latter video segment of two consecutive ones of the N consecutive video segments is M times a downloading duration of a previous video segment of the two consecutive ones of the N consecutive video segments, wherein M is a positive integer; and in response to determining that the downloading duration of the latter video segment is M times the downloading duration of the previous video segment, obtaining a downloading duration and a downloading byte count of each of further M consecutive video segments;

calculating out a total downloading duration and a total downloading byte count of the N video segments according to the downloading duration and the downloading byte count of each of the N video segments, wherein the calculating out the total downloading duration and the total downloading byte count of the N video segments according to the downloading duration and the downloading byte count of each of the N video segments comprises:

calculating out a total downloading duration and a total downloading byte count of the (N+M) video segments according to the downloading duration and the downloading byte count of each of the (N+M) video segments; and calculating out a current network speed according to the total downloading duration and the total downloading byte count.

7. The computing device of claim 6, wherein each of the multiple video segments is a respective segment of the video content having a set play duration, or a respective segment of the video content having a set byte count.

8. The computing device of claim 6, wherein the one or more non-transitory computer-readable storage media further comprise instructions configured to cause the one or more processors to perform operations including:

determining, upon receiving the network speed measurement command, whether a required downloading byte count for downloading a segment of the video content having a set play duration is greater than a set byte count;

in response to determining that the required downloading byte count for downloading the segment of the video content having the set play duration is greater than the set byte count, taking each segment of the video content having the set play duration as a respective one of the multiple video segments; and in response to determining that the required downloading byte count for downloading the segment of the video content having the set play duration is not greater than the set byte count, taking each segment of the video content having the set byte count as a respective one of the multiple video segments.

9. The computing device of claim 6, wherein the one or more non-transitory computer-readable storage media further comprise instructions configured to cause the one or more processors to perform operations comprising, after calculating out the current network speed:

adjusting a resolution of a segment of the video content currently being played according to the current network speed, so that the adjusted resolution adapts to the current network speed.

10. The computing device of claim 6, wherein the N consecutive video segments are at least four video segments.

11. A non-transitory computer-program product tangibly embodied in a machine-readable non-transitory storage medium that comprises instructions configured to cause one or more processors to perform operations comprising:

obtaining downloading duration and downloading byte count of each of N consecutive video segments upon receiving a network speed measurement command during downloading video content, wherein N is a positive integer, wherein the video content comprises multiple video segments, and wherein the obtaining the downloading duration and the downloading byte count of each of the N consecutive video segments comprises:

determining whether a downloading duration of a latter video segment of two consecutive ones of the N consecutive video segments is M times a downloading duration of a previous video segment of the two consecutive ones of the N consecutive video segments, wherein M is a positive integer; and in response to determining that the downloading duration of the latter video segment is M times the downloading duration of the previous video segment, obtaining a downloading duration and a downloading byte count of each of further M consecutive video segments;

calculating out total downloading duration and total downloading byte count of the N video segments according to the downloading duration and the downloading byte count of each of the N video segments, wherein the calculating out the total downloading duration and the total downloading byte count of the N video segments according to the downloading duration and the downloading byte count of each of the N video segments comprises:

calculating out a total downloading duration and a total downloading byte count of the (N+M) video segments according to the downloading duration and the downloading byte count of each of the (N+M) video segments; and calculating out a current network speed according to the total downloading duration and the total downloading byte count.

12. The non-transitory computer-program product of claim 11, wherein each of the multiple video segments is a respective segment of the video content having a set play duration, or a respective segment of the video content having a set byte count.

13. The non-transitory computer-program product of claim 11, further comprising instructions configured to cause one or more processors to perform operations comprising:

determining, upon receiving the network speed measurement command, whether a required downloading byte count for downloading a segment of the video content having a set play duration is greater than a set byte count;

in response to determining that the required downloading byte count for downloading the segment of the video content having the set play duration is greater than the set byte count, taking each segment of the video content having the set play duration as a respective one of the multiple video segments; and in response to determining that the required downloading byte count for downloading the segment of the video content having the set play duration is not greater than the set byte count, taking each segment of the video content having the set byte count as a respective one of the multiple video segments.

14. The non-transitory computer-program product of claim 11, further comprising instructions configured to cause one or more processors to perform operations comprising, after calculating out the current network speed:

adjusting a resolution of a segment of the video content currently being played according to the current network speed, so that the adjusted resolution adapts to the current network speed.

15. The non-transitory computer-program product of claim 11, wherein the N consecutive video segments are at least four video segments.

* * * * *